United States Patent [19] [11] 3,924,347
Conibear [45] Dec. 9, 1975

[54] ACTUATOR FOR ANIMAL TRAP
[76] Inventor: Frank R. Conibear, 2170 Evergreen Place, Victoria, British Columbia, Canada
[22] Filed: Aug. 16, 1974
[21] Appl. No.: 498,239

[52] U.S. Cl. .................................................. 43/90
[51] Int. Cl.² ......................................... A01M 23/26
[58] Field of Search .............. 43/88, 90, 91, 92, 93, 43/94, 95

[56] References Cited
UNITED STATES PATENTS
3,010,245  11/1961  Conibear ................................ 43/90
3,816,955  6/1974   Conibear ................................ 43/90
FOREIGN PATENTS OR APPLICATIONS
272,098  6/1927  United Kingdom ..................... 43/88

Primary Examiner—Warner H. Camp
Attorney, Agent, or Firm—Smart & Biggar

[57] ABSTRACT

An improved actuator for a rotating frame animal trap, wherein an additional ring is fixed to the outer edge of each of the rings of the actuator so that, when the actuator rings are fully expanded about the adjacent ends of the trap frame when the trap is closed, the actuator rings are prevented from sliding over the corners of the frames onto the jaws of the trap. Where one of the actuator rings is provided with an opening, for quick release from the trap, its additional ring is similarly provided with an opening coinciding with that of the open ring. The adjacent ends about which the actuator rings are normally disposed must be constructed to provide sufficient space for the two pairs of double rings, when the trap is in open, set position.

8 Claims, 4 Drawing Figures

ACTUATOR FOR ANIMAL TRAP

BACKGROUND OF THE INVENTION

This invention relates to an improved actuator for a rotating frame type of animal trap. By a rotating frame trap is meant a trap which comprises a pair of similar frames, which may be of a generally square or rectangular shape or of part-trapezoidal shape, pivotally connected at adjacent ends for relative rotation on a common axis so as to form by their sides two pairs of co-acting jaws. At least one actuator, consisting of arms spring biased at one end so that the other ends, if unobstructed, would move to a distance substantially greater than the length of the frame ends, and having each arm terminating in a ring adapted to encircle one set of adjacent ends of the frames, is used to urge the jaws towards, and maintain them in, closed position. Such a trap is described in my U.S. Pat. No. 3,010,245, dated Nov. 28, 1961 (square or rectangular shape), or my U.S. Pat. No. 3,760,531, dated Sept. 25, 1973 (part-trapezoidal shape). The ends of these rotating frame traps which coperate with the rings are shaped so that when the trap is in open set position, these ends lie substantailly parallel to each other, while the central portions of these ends near the common axis of the frames form a cross with each other between the actuator rings. A suitable trigger means (for example as described in my U.S. Pat. No. 3,010,245, Lehn, U.S. Pat. No. 3,947,107, dated Aug. 2, 1960 or my U.S. Pat. No. 3,762,094, dated Oct. 2, 1973), maintains the frames in open position when the trap is set, but when the trap is sprung, releases the frames so as to permit, as a result of the action of the actuator rings on the frame ends, rapid rotation of the frames through an angle of about 90 degrees, so that the jaws quickly strike and squeeze an animal in the trap to kill it.

A problem with traps of square or rectangular shape has been the tendency of one of the actuator rings, when the rings are fully expanded about the adjacent ends of the trap frames when the trap is closed, to slip over its corresonding corner onto the corresponding jaws of the trap. This results in an immediate loss of clamping force tension in the trap. When this happens, the remaining force exerted by the actuator upon the jaws of the trap may not be sufficient to kill the animal, if the force of impact of the jaws on the animal's body has not already done so. Where the actuator has a ring with an opening therein for quick release, according to the teachings of my U.S. Pat. application Ser. No. 208,797, now Pat. No. 3,816,955, the quick release aspect of this feature also becomes inoperative when the ring in question slides onto the jaws of the trap. Correction of these problems results in a safer, more effective and more humane trap, and various solutions have been attempted. An obvious solution for the problem has been to reduce the size of the actuator rings. However, such a solution sacrifices initial starting power and consequently reduces the strength of impact of the jaws upon an animal which is trapped. Moveover, if a bulky animal is caught in a trap having such small actuator rings, the rings will now have travelled far enough along adjacent end members of the frame, when they are prevented from travelling further by the resistance of he animal's body to the closing of the jaws of the trap, to exert sufficient clamping pressure on the animal to quicly kill it. In my aforesaid U.S. patent application is described a rotating frame trap having square or rectangular frames having spurs or ears projecting outwardly from the corners at the ends of adjacent frame ends to obstruct the rings of the expanded actuator and prevent these rings from sliding over the frame corners onto the jaws. These spurs add to the expense and difficulty of manufacturing such traps. As well, they make the trap difficult to pack and clumsy to operate for a trapper.

It is an object of the present invention to provide an actuator for a rotating frame trap, which is less likely to slip over the corners of the trap onto the jaws when in closed position, and yet which is economical and simple to construct. It is a further object of the present invention to provide a modified trap frame for use in conjunction with such an improved actuator.

SUMMARY OF THE INVENTION

In order to achieve these and other ends, an additional ring is fixed along the outer edge of each of the rings of the actuator. Where one of the rings of the actuator is not fully closed but is instead provided with an opening of sufficient width so that adjacent ends of the frame, around which the ring is disposed, can when required, pass — a quick release feature as described in my U.S. Pat. No. 3,816,955 — the additional ring is similarly provided with an opening coinciding with that of the actuator ring. Where this ring is provided with a keeper cooperating with engaging means as described in that application, the additional ring of course does not interfere with the engagement and disengagement of the keeper across the opening in the ring.

A portion of each additional ring attached to the actuator rings abuts against the inner edges of the jaws of the trap, when the trap is in closed position, to keep the actuator rings a sufficient distance away from the corners of the trap frames. In this way, the actuator rings cannot slip over the corners of these frames onto the jaws of the trap. At the same time, the actuator spring is more compressed in closed position which these additional rings than it would be without them, the actuator rings travelling a shorter distance to reach fully expanded position on the closed trap. This means that greater clamping force is exerted by the jaws of the closed trap. For a similar reason, greater starting force is exerted by the actuator on the trap when in open, set position.

The frames of the trap must be constructed in such a manner that there is sufficient space between the frame ends, when the trap is in open position, to house these four rings of the actuator. This requires that the central crossing portion of each of these frame ends, where the actuator rings rest when in open position, be of a greater distance than normal, i.e. that these frame ends have a wider "off-set" than is found normally on such traps. This modification results in some loss of starting power in the trap, immediately after it is fired. It has been found useful, in order to compensate for this, to provide a slight outward bend at the ends of the frame ends of the trap, when in set position. In this way, the frame ends offer less resistance to the actuator rings as they close over these end portions of the frame ends, thereby resulting in the trap having a greater impact strength on an animal trapped.

It is also desirable, in order to have these rings take up as little lateral space as possible when together in compressed position in the open, set trap, to have the actuator rings flush together along their inner sides by providing the arms of the actuator with slight outward bends. Such a bend also assists to prevent the rings when fully expanded from slipping over the corners of the frames.

BRIEF DESCRIPTION OF THE DRAWINGS

Other objects and advantages of the invention will become apparent upon reading the following detailed description and upon reference to the drawings in which.

While the invention will be described in connection with preferred embodiments, it will be understood that it is not intended to limit the invention to those embodiments. On the contrary, it is intended to cover all alternatives, modifications and equivalents as may be included within the spirit and scope of the invention as defined by the appended claims.

DETAILED DESCRIPTION OF THE INVENTION

Figure 1:
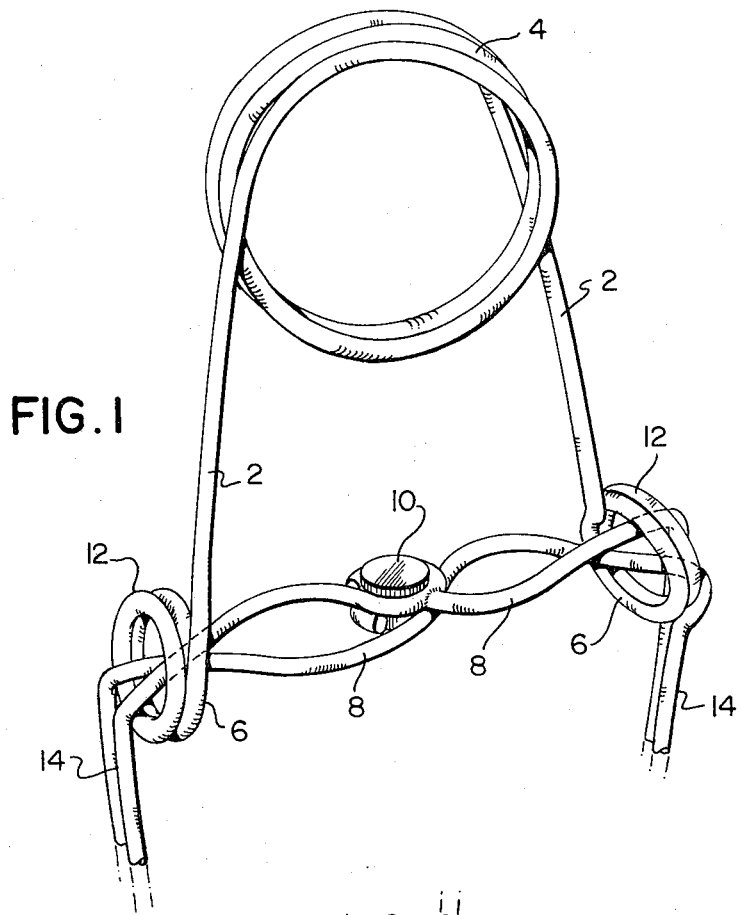
FIG. 1 is a perspective view of an actuator according to the present invention shown on the upper portion of a rotating frame trap in closed position.

Turning now to the drawings, in which similar features have been given similar reference numerals, there are shown in FIG. 1 actuator arms 2 spring biased at one end by coil spring 4 and forming, at their other ends, rings 6 which encircle adjacent frame ends 8, said adjacent frame ends connected at pivot 10. Additional rings 12 are shown fixed to the outer edges of rings 6, for example by welding. Alternatively, rings 12 may each be a second ring formed adjacent to ring 6 by looping actuator arm 2 a second time, after it has been looped a first time to form ring 6. It can be seen that the lower portions of rings 12, by abutting against the inner sides of jaws 14, prevent ring 6 from approaching close enough to the corners of the trap frame (i.e. where the ends and jaws of the trap meet) to slide onto jaws 14. Similarly, for the same reason, the rings 12 prevent rings 6 from expanding completely along adjacent frame ends 8. This means that greater tension is exerted on these rings by arms 2 and spring 4, so that greater clamping force is exerted by jaws 14.

Figure 2:
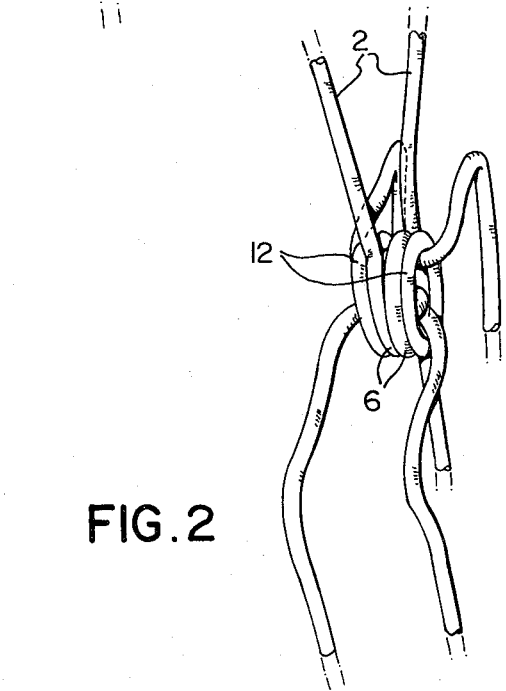
FIG. 2 is a perspective view of the actuator and portion of the trap illustrated in FIG. 2, in open, set position.

In FIG. 2, the trap frames and actuator are shown in open, set positions. It can be seen that arms 2, near where they join rings 6, have been each bent slightly outwarldy so that, in this closed position, springs 6 are virtually flush with one another along their inner sides. This ensures that the rings take up as little lateral space as possible, about the adjacent frame ends in closed position. As well, because of this bend, spring 4 is that much more compressed when the lower portions of rings 12 abut against the inner sides of jaws 14 when in closed position as shown in FIG. 1, thus resulting in even greater clamping force on the jaws of the trap.

Figure 3:
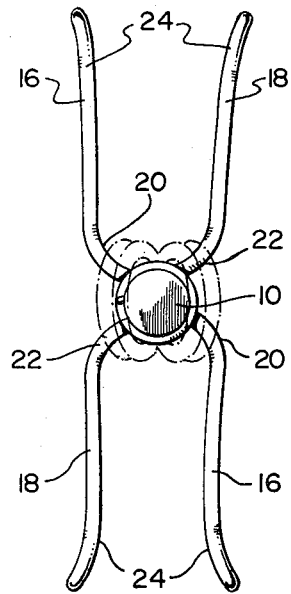
FIG. 3 is a top view of the frames of a rotating frame trap modified in accordance with this invention, in open, set position.

In view of the lateral width of these two pairs of double rings, when in closed position as shown in FIG. 2, it is necessary to ensure that there is sufficient space for them between opposite frame ends, where these frame ends bear against the actuator rings, when in open, set position. In the standard rotating frame trap, the frame ends encircled by these actuator rings generally consist of two non-collinear sections 16 or 18 (shown in FIG. 3) connected by a third section 20 or 22, which third section forms an obtuse or right angle with each of these two non-collinear sections. The frame ends are pivoted at 10 through these off-set sections 20 and 22. It can be seen from FIG. 3, that in order to house the rings of the actuator and additional rings 12, when the trap is in open, set position, there must be sufficient space between oppositely urged sections 16 and 18, on the same side of the pivot, where these sections bear against the actuator rings (shown in phantom), so that the trap can be set. This may require increasing the length of off-set sections 20 and 22. It is believed that any lost starting power arising because of this construction of frame ends is made up for by the increased force on the actuator rings because of the fact that spring 4 is under greater compression, in set position, as a result of additional rings 12. As well, it has been found that, by adding outward bend 24, as shown in FIG. 3, to the end portions of frame ends 16 and 18, greater impact strength results. These bends permit greater pressure to be applied by the rings, in the final stages of closing of the trap since these frame ends then offer less resistance to the actuator rings as they close over these end portions of the frame ends. If these portions of the frame ends were not bent, or were bent in the opposite direction, the rings would meet greater resistance until, if they were bent too far in this opposite direction, the actuator would in fact be stopped.

Figure 4:
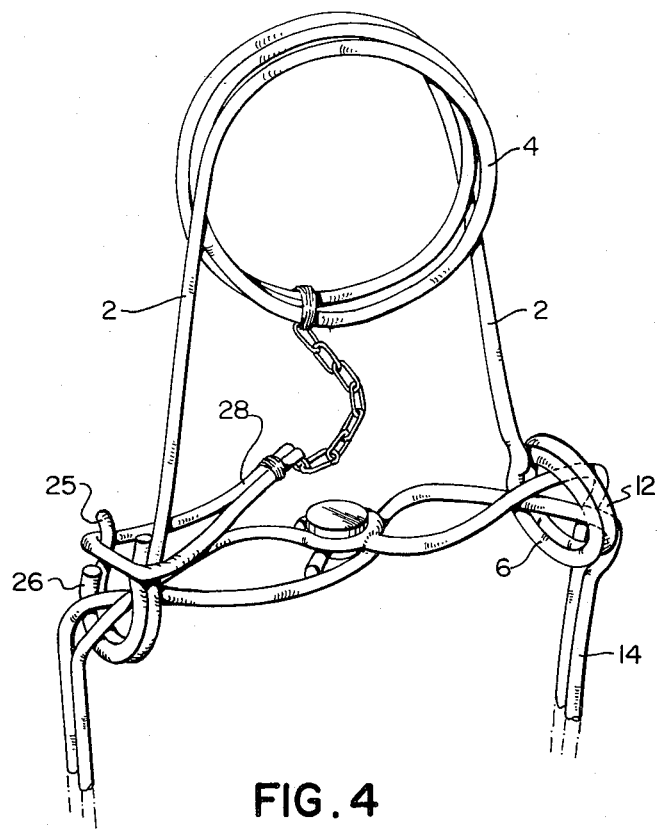
FIG. 4 is a perspective view of a "quick release" actuator according to the present invention illustrated on the upper portion of a rotating frame trap in closed position.

The double ring feature of the present invention can be applied to a "quick release" actuator as described in my U. S. Pat. No. 3,816,955. In this embodiment, illustrated in FIG. 4, actuator ring 25 has an opening, the width of this opening being substantially greater than the diameter of the wire stock from which the frames are made, and its width and position being such that, when the actuator, in sprung condition with its rings encircling adjacent ends of the frames of the trap, is swivelled around the frames of the trap, to a predetermined position (not normally achieved in either set or closed position or while the trap is closed), the adjacent frame ends encircled by the one ring can readily pass through the opening. By so swivelling the actuator, the adjacent frame ends can thus be disengaged from ring 25 permitting the clamping force closing the jaws of the trap to be released. It can be readily appreciated that additional ring 26, attached to this open ring, must have a similar opening coinciding with that of open ring 6. As well, where a keeper member 28 (also shown in FIG. 4) is used to releasably close this open ring to prevent unpurposeful disengagement of the actuator ring in question from its position encircling adjacent frame ends, additional ring 26 must not interfere with the removal or positioning of this keeper across the opening in ring 6. It can be understood that, by preventing either of actuator rings 6 from sliding over the corresponding corners of the trap frames onto jaws 14, in which case the actuator could not be properly swivelled to disengage the frame ends from ring 25, the use of ears or spurs on the frames of the trap to prevent this from happening can be avoided. The use of this double ring feature on the quick release actuator is a simple, economical way to avoid this problem and improve the reliability of this type of actuator.

Thus, it is apparent that there has been provided, in accordance with the invention, an improved actuator and trap therefor that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

What is claimed is:

1. In an animal trap of the type having similar first and second frames, each having sides serving as jaws and ends extending therebetween, and which are pivotally connected through adjacent ends for relative rotation between set and closed positions about a common axis, a trigger means for releasably maintaining the trap in set position and an actuator capable of rapidly and forcefully effecting such rotation, having two arms spring biased at one end so that the other end, if unobstructed, would move to a distance substantially greater than the length of said frame ends, each arm terminatng in an actuator ring respectively adapted to encircle adjacent ends of both frames on opposite sides of said axis, an improved actuator wherein an additional ring is fixed along an edge of each of the actuator rings of the actuator to form effectively thicker ring structures at the arm ends whereby when the actuator is expanded onthe closed trap, the outer ones of the actuator rings and additional rings on the arms abut against the inner sides of the jaws of the trap to prevent the actuator rings from sliding over the corners of the frames onto the jaws of the trap.

2. An improved actuator according to claim 1 in which one of said actuator rings has an opening, the width and positioning of such opening being such that, when the actuator, in sprung condition with its rings encircling adjacent ends of the frames of the trap, is swivelled around the frames of the trap to a predetermined position (not normally achieved in either set or closed position or while the trap is closing), the adjacent frame ends encircled by the one ring can readily pass through the opening, wherein said additional ring on said open ring has an opening coinciding with and of about the same width as that of the open ring.

3. An improved actuator according to claim 2 further comprising a keeper adapted to be fastened for purposeful disengagement across said opening whereby said open ring is closed to prevent said adjacent frame ends disposed within said ring from passing through said opening while said keeper is fastened across said opening.

4. An animal trap according to claim 3 wherein said keeper is adapted to be fastened to one arm of the actuator on one side of the opening and to a hook-like lip on the other side of the opening.

5. An improved actuator according to claim 1 wherein said actuator rings are bent slightly outwardly on said actuator arms whereby, when the actuator is in compressed position, the inner edges of the rings are generally entirely flush with respect to each other.

6. An animal trap of the type having similar first and second frames, each having sides serving as jaws and ends extending therebetween, and which are pivotally connected through adjacent ends for relative rotation between set and closed positions about a common axis, said ends consisting of two non-collinear sections connected by a third, off-set section, which section forms an obtuse or right angle with each of these two non-collinear sections, the pivotal connection of the frame being in this off-set section, a trigger means for releasably maintaining the trap in set position and an actuator capable of rapidly and forcefully effecting such rotation, having two arms spring biased at one end so that the other end, if unobstructed, would move to a distance substantially greater than the length of said frame ends, each arm terminating in an actuator ring respectively adapted to encircle adjacent ends of both frames on opposite sides of said axis, an additional ring being fixed along an edge of each of the actuator rings of the actuator, whereby, when the actuator is expanded on the closed trap, the outer ones of the actuator rings and additional rings on the arms abut against the inner edges of the jaws of the trap to prevent the actuator rings from sliding over the corners of the frames onto the jaws of the trap, said off-set sections being of sufficient length to provide sufficient space between oppositely urged sections of the frame ends, when the trap is in open, set position, for the actuator rings and additional rings.

7. An animal trap according to claim 6 wherein the ends of the adjacent frame ends encircled by the actuator rings are bent slightly outwardly in open, set position whereby, in the final stages of closing of the trap, these frame ends offer less resistance to the actuator rings as they close over these end portions of the frame ends.

8. An animal trap according to claim 1 wherein said additional rings are fixed along the outer edges of the actuator rings, such that said additional rings abut against the inner sides of said jaws in the expanded state of the actuator.

* * * * *